(12) United States Patent
McGuire

(10) Patent No.: US 10,072,945 B1
(45) Date of Patent: Sep. 11, 2018

(54) JACK LEVELING APPARATUS AND CONTROL SYSTEM THEREFOR

(71) Applicant: LIPPERT COMPONENTS MANUFACTURING, INC., Elkhart, IN (US)

(72) Inventor: Larry Allan McGuire, Elkhart, IN (US)

(73) Assignee: LIPPERT COMPONENTS MANUFACTURING, INC., Elkhart, IN (US)

(*) Notice: Subject to any disclaimer, the term of this patent is extended or adjusted under 35 U.S.C. 154(b) by 135 days.

(21) Appl. No.: 15/196,993

(22) Filed: Jun. 29, 2016

Related U.S. Application Data

(60) Provisional application No. 62/188,007, filed on Jul. 2, 2015.

(51) Int. Cl.
| | | |
|---|---|---|
| *G01L 3/24* | (2006.01) | |
| *G01D 5/14* | (2006.01) | |
| *B66F 3/08* | (2006.01) | |
| *G01L 1/00* | (2006.01) | |
| *B60S 9/06* | (2006.01) | |

(52) U.S. Cl.
CPC ............... *G01D 5/142* (2013.01); *B60S 9/06* (2013.01); *B66F 3/08* (2013.01); *G01L 1/00* (2013.01)

(58) Field of Classification Search
CPC ... G01D 5/142; B60S 9/06; B66F 3/08; G01L 1/00; G01L 3/24
USPC .......................................................... 73/862
See application file for complete search history.

(56) References Cited

U.S. PATENT DOCUMENTS

| | | | | |
|---|---|---|---|---|
| 6,050,573 A * | 4/2000 | Kunz | ................... | B60G 17/005 |
| | | | | 254/45 |
| 6,768,936 B2 * | 7/2004 | Fiorletta | .............. | B60G 17/005 |
| | | | | 701/36 |
| 7,226,057 B2 * | 6/2007 | Eichhorn | .................. | B60S 9/12 |
| | | | | 280/6.153 |
| 7,926,600 B2 * | 4/2011 | Flynn | ........................ | B60S 9/02 |
| | | | | 180/41 |
| 8,028,973 B2 * | 10/2011 | Ford | ........................ | H02P 6/16 |
| | | | | 187/203 |
| 8,215,673 B2 * | 7/2012 | Ford | ........................ | B60S 9/12 |
| | | | | 180/41 |
| 2010/0176359 A1 * | 7/2010 | Wisner | ..................... | B60S 9/08 |
| | | | | 254/425 |

* cited by examiner

*Primary Examiner* — Jonathan Dunlap
*Assistant Examiner* — Octavia Hollington
(74) *Attorney, Agent, or Firm* — Barnes & Thornburg LLP

(57) ABSTRACT

A jack leveling apparatus utilizes a Hall effect sensor to determine a rate of movement of the jack leveling apparatus. The rate of movement is correlated to loading or unloading of the jack level device. When a load is applied to the jack level, the rate of movement will slow while alternatively, if a load is removed, the rate of movement will increase. Utilizing these values, the controller may also determine the position of the leg of the jack level device.

13 Claims, 16 Drawing Sheets

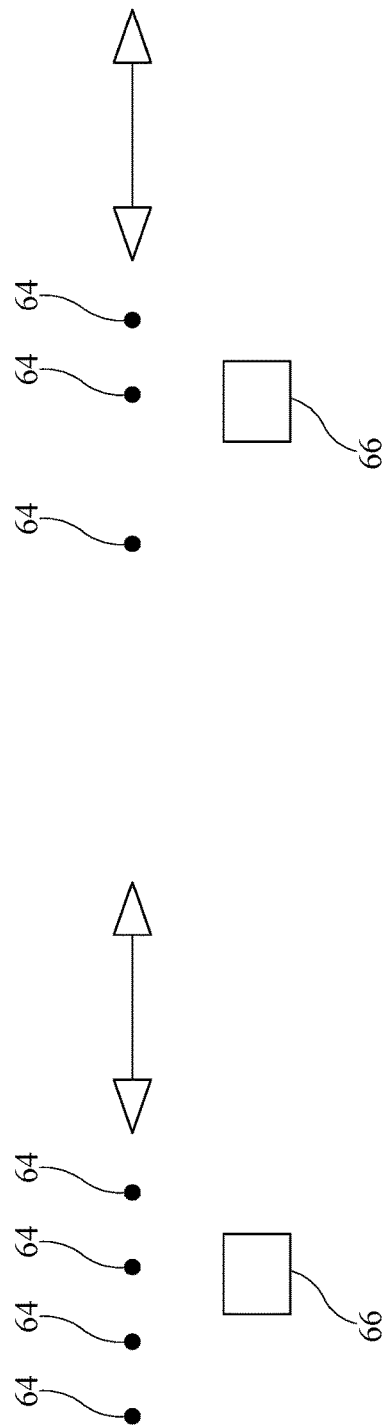
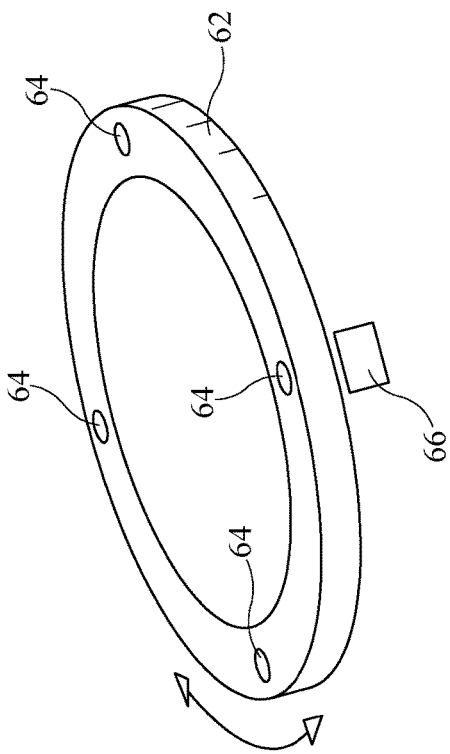
FIG. 10A  FIG. 10B  FIG. 10C  FIG. 10D

JACK LEVELING APPARATUS AND CONTROL SYSTEM THEREFOR

CLAIM TO PRIORITY

This Non-Provisional Patent Application claims priority to and benefit under 35 U.S.C. § 119 of Provisional Patent Application having Ser. No. 62/188,007 filed Jul. 2, 2015, titled "Jack Leveling Apparatus".

BACKGROUND

Present embodiments relate to a jack level for a recreation vehicle (RV), camper, tow-behind or truck bed mounted camper device. More specifically, present embodiments relate to a jack leveling system which utilizes a sensor to determine rate of movement of the jack and change in rate of movement which is in turn is related to load.

When camping in a recreational vehicle (RV), it is desirable to level the vehicle when stopped for camping. This is desirable so that sleeping occurs at a level condition to prevent uncomfortable resting. The leveled condition provides living conditions closer to normal, as in a stationary home or other fixed structure, which are known to be leveled during the construction process. One skilled in the art will appreciate that certain appliances should be operated at level conditions and also to prevent unintended opening of cabinets and resultant breakage of glasses, dishes and the like.

Various leveling devices may be utilized at corners of the recreational vehicle, at sides of the vehicle or at one or more ends of the vehicle to provide leveling options at multiple locations for the best end condition.

Jacks may be created from hydraulic systems, electric systems or other fluid or mechanical powered structures which extend or retract to produce the lifting or lowering function at the desired location where the jack may be installed.

In utilizing the jack level devices, it would be desirable for a controller to know the position or location of the jack once the load is engaged or disengaged. It is also desirable to know the position of the jack relative to stops either at an outer limit or an inner limit of the range of motion.

Prior art devices have utilized various means to determine position of a jack level leg. However, it would be desirable to determine a rate of movement in order to provide a correlating position and determine a change of the rate of movement of the jack level to determine loading conditions on the jack leveling apparatus.

The information included in this Background section of the specification, including any references cited herein and any description or discussion thereof, is included for technical reference purposes only and is not to be regarded subject matter by which the scope of the invention is to be bound.

SUMMARY

Present embodiments provide a jack level apparatus which utilizes a Hall effect sensor to determine rate of movement of a leg of the jack level device. The rate of movement is correlated to loading on the jack level device. Thus, when a load is applied to the jack level, the rate of movement will slow while alternatively, if a load is removed, the rate of movement will increase. Utilizing these values, the controller may also determine the position of the leg of the jack level device.

According to some embodiments, a jack leveling apparatus comprises a fixed portion and a movable leg, the movable leg having a foot near an end, a motor which rotates an actuator to extend or retract the movable leg and the foot, at least one magnet disposed opposite a Hall effect sensor, the magnet creating an electromagnetic field, causing the Hall effect sensor to create multiple pulses in response to movement of a portion of the apparatus. The Hall effect sensor which senses the electromagnetic field and provides at least one pulse per rotation of one of the motor, the actuator, or movement of the movable leg responsive to the at least one magnet. A controller has a counter which counts the multiple pulses provided by the Hall effect sensor, wherein the controller takes a derivative of the count during a time period to determine a rate of motion of at least one of the motor, the actuator or the movable leg.

Optionally, the jack leveling apparatus correlates a change of rate of motion to a change in loading. At least two rates of motion may be programmed into a controller. The controller may be pre-programmed by an installer or by an end-user. The controller may determine the at least two rates of motion and compare the at least two rates of motion. The controller may further determine a fully extended or a fully retracted position. The jack leveling apparatus may further comprise a clutch disposed between the motor and the actuator. The actuator may be a threaded rod. The jack leveling apparatus may further comprise a level sensor for each of roll, twist and pitch.

According to further embodiments, a jack leveling apparatus comprising a motor which rotates to extend or retract an extendable leg having a foot thereon, the leg including an actuator operably connected to the motor to move the extendable leg. A controller in electrical communication with a Hall effect sensor and at least one magnet disposed opposite said Hall effect sensor. The controller receiving a signal from the Hall effect sensor when the magnet passes during movement, wherein the controller determines a rate of movement of the leg and then determines a load condition on the foot based on a change in the rate of movement.

Optionally, the magnet may be disposed on one of the motor or the actuator. The Hall effect sensor may be disposed in the other of the motor or the actuator. The rate of movement may be measured as a number of pulses per unit of time.

In some embodiments, a method of determining load on a jack leveling apparatus may comprise learning at least one of an upper limit and a lower limit of the jack leveling apparatus having a Hall effect sensor and a magnet, the Hall effect sensor providing an output to a controller based on movement of a portion of the jack leveling apparatus, determining a first rate of movement of at least one of an extendable leg or a foot based on a rate change detected by the Hall effect sensor and the controller, the first rate corresponding to one of loaded or unloaded condition of the leg or foot, determining a second rate of movement of the at least one extendable leg or foot based on a rate change detected by the Hall effect sensor and the controller, the second rate of movement corresponding to the other of the loaded or unloaded condition of the leg or foot, and, determining a load condition based on comparison of the first rate of movement and the second rate of movement.

Optionally, the method may further comprise utilizing time between magnet passes to determine rate of movement or the rate change. The method may utilize pulses to determine rate of movement or the rate change. The method may further comprise determining roll, twist and pitch with at least two level sensors.

All of the above outlined features are to be understood as exemplary only and many more features and objectives of a jack level apparatus may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the jack leveling apparatus will now be described by way of examples. These embodiments are not to limit the scope of the claims as other embodiments of the jack leveling apparatus will become apparent to one having ordinary skill in the art upon reading the instant description. Non-limiting examples of the present embodiments are shown in figures wherein:

FIGS. 10a-10d depict a schematic view of various arrangements of the magnet(s) and Hall effect sensor;

DETAILED DESCRIPTION

Figure 1:
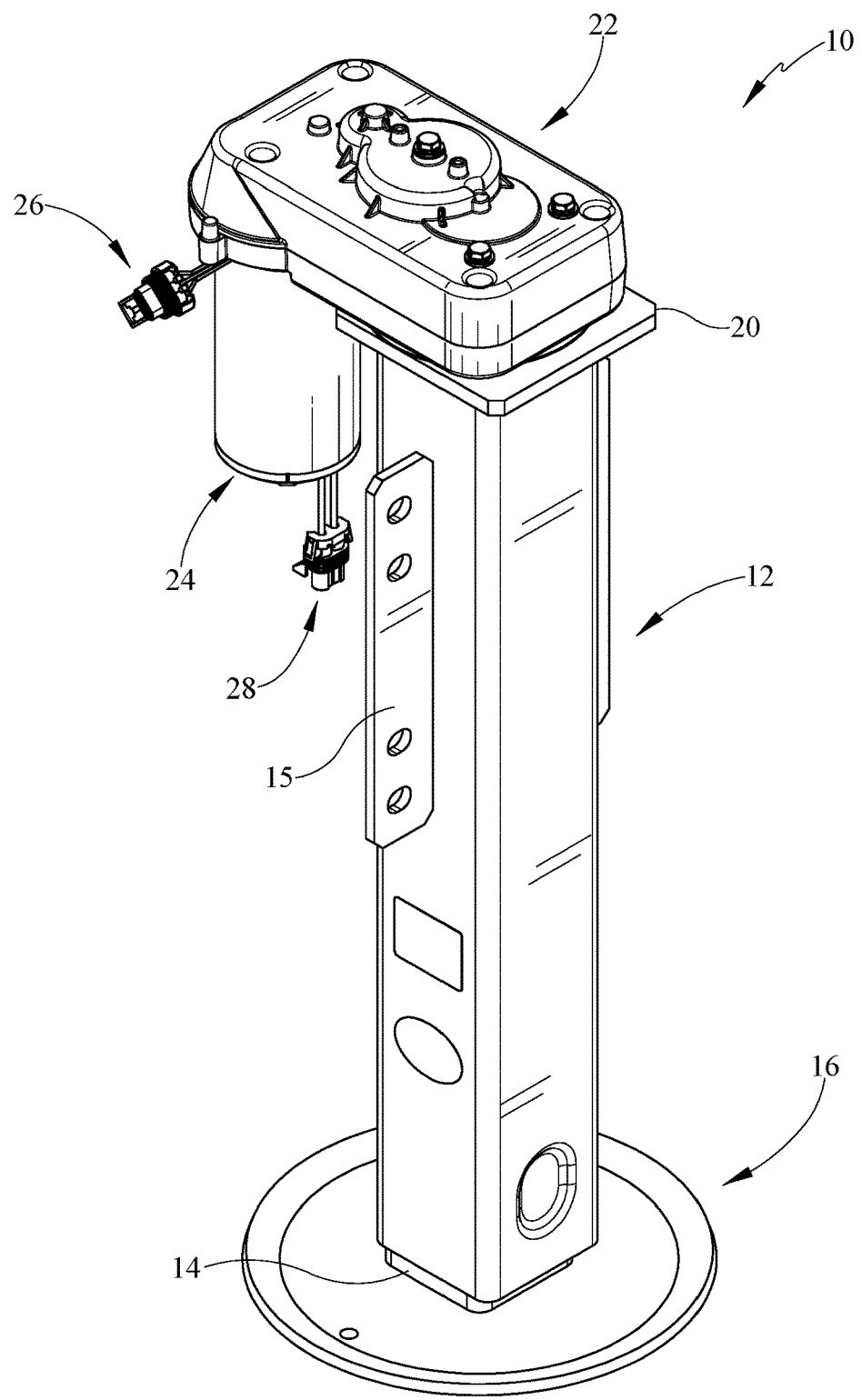
FIG. 1 is a perspective view of an exemplary jack leveling apparatus.

It is to be understood that the jack leveling apparatus is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The term "controller" is used herein generally to describe various apparatus relating to the operation of one or more jack leveling apparatus. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

Referring now in detail to the figures, wherein like numerals indicate like elements throughout several views, there are shown in FIGS. 1-16 various embodiments of a jack leveling apparatus. The apparatus may comprise various types of jacks including, but not limited to, a vertical jack leg, a flip or folding jack leg or scissor jack system which is motorized and which have utilized with a sensor to determine a rate of motion and correlate the rate of motion with loading on the jack. Further, the position of the jack may be determined as well. The jack leveling apparatus or any of the various embodiments may be utilized with a RV, camper, trailer, utility or other such vehicles.

Referring now to FIG. 1, an upper perspective view of an exemplary jack leveling apparatus 10 is depicted. The structure includes a first leg 12 and a second leg 14. The legs 12, 14 may be square in cross-section but may be alternative shapes such as circular or other shapes which may be hollow or partially hollow. As further alternative, the legs 12, 14 may be defined by frame-type structures formed of a plurality of struts or structural members. One of the first and second legs 12, 14 is may be moveable relative to the other during operation. In the exemplary embodiment, the first leg 12 is an exterior portion which functions in part as a housing for the second leg 14 so that the second leg 14 moves into or out of the first leg 12. As will be described later, the first and second legs 12, 14 may both be moveable or in alternative embodiments, an inner leg may be fixed such that an outer leg moves along the outside of the inner leg opposite to the embodiment depicted in FIG. 1.

At the bottom of one of the first and second legs 12, 14 is a foot 16. The foot 16 engages the ground and provides a surface against which the jack leveling apparatus 10 can both engage the ground and push from so as to level the RV, camper, trailer, utility or other vehicle. At the opposite end of the first and second legs 12, 14 is a mounting plate 20. The mounting plate 20 is connected to the first leg 12, according to the instant embodiment, and provides a base upon which a drive 22 is positioned.

One of the legs 12, 14 may also have one or more flanges 15 that allow connection to the adjacent camper. The flanges 15 may be integrally formed or may be welded or otherwise connected to at least one of the legs 12, 14.

Opposite the first and second legs 12, 14 and connected to the drive 22 is a motor 24. The motor 24 is powered and rotates to create motion of the drive 22 which in turn causes movement within one of the first and second legs 12, 14 in the instant embodiment. The movement creates the leveling force on the camper and causes operation for leveling to occur. The motor 24 of the present embodiment is electric, however alternate motor types may be used such as fluid powered, for example hydraulic or pneumatic motors.

Figure 2:
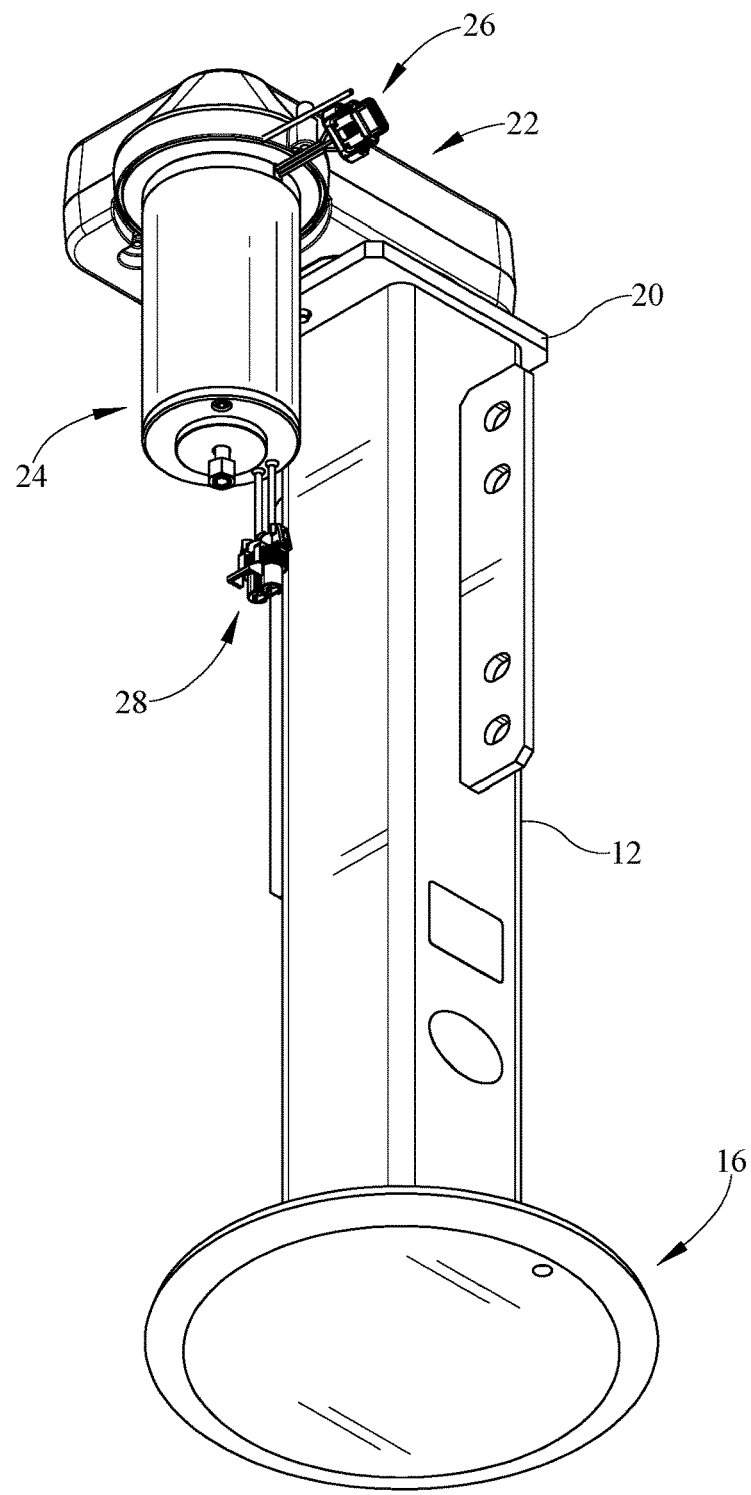
FIG. 2 is a lower perspective view of an exemplary jack leveling apparatus.

Referring now to FIG. 2, a lower perspective view is depicted. The lower perspective view depicts the lower surface of the foot 16 which engages the ground. The exemplary foot 16 is shown as generally circular but may alternatively be a square shape or still further may have alternative polygonal shapes.

Extending upwardly above the foot 16 is the first leg 12. The second leg 14 is not shown due to the angle of the view. In this view, the drive 22 is also shown at the upper end of the first leg 12 and the motor 24 is shown depending from the drive 22.

Figure 13:
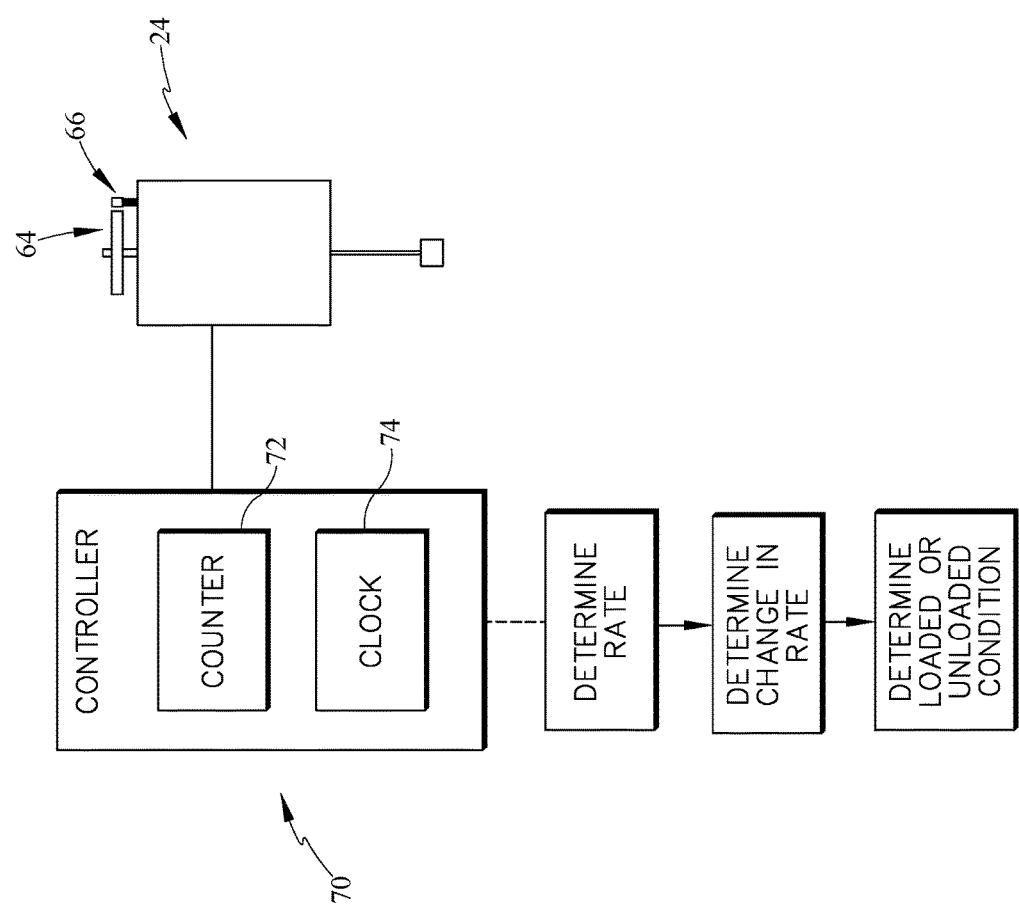
FIG. 13 is a schematic view of the sensor, magnet and a controller.

Extending from the motor 24 in FIGS. 1 and 2 are two connectors. The first connector 26 is a cable connector for sensor communication to a controller 70 (FIG. 13). The second connector 28 shown extending from the lower portion of the motor 24 is utilized to power the motor 24. The positions of the quick connectors 26, 28 are not limiting and these may extend from a more similar location or differing locations as depicted. Still further, the types of quick connectors 26, 28 are not considered to be limiting as various types of connections may be utilized in order to provide controller communication and power to the motor 24. Still further, while two wires are shown extending from each connector 26, 28, the assembly may alternatively have one cable with two or more wires inside a cable jacket. Further, with regard to the wires associated with the first quick connector 26, alternate embodiments may comprise wireless connectivity between the sensor 66 (FIG. 8) and the controller 70 (FIG. 13).

Figure 3:
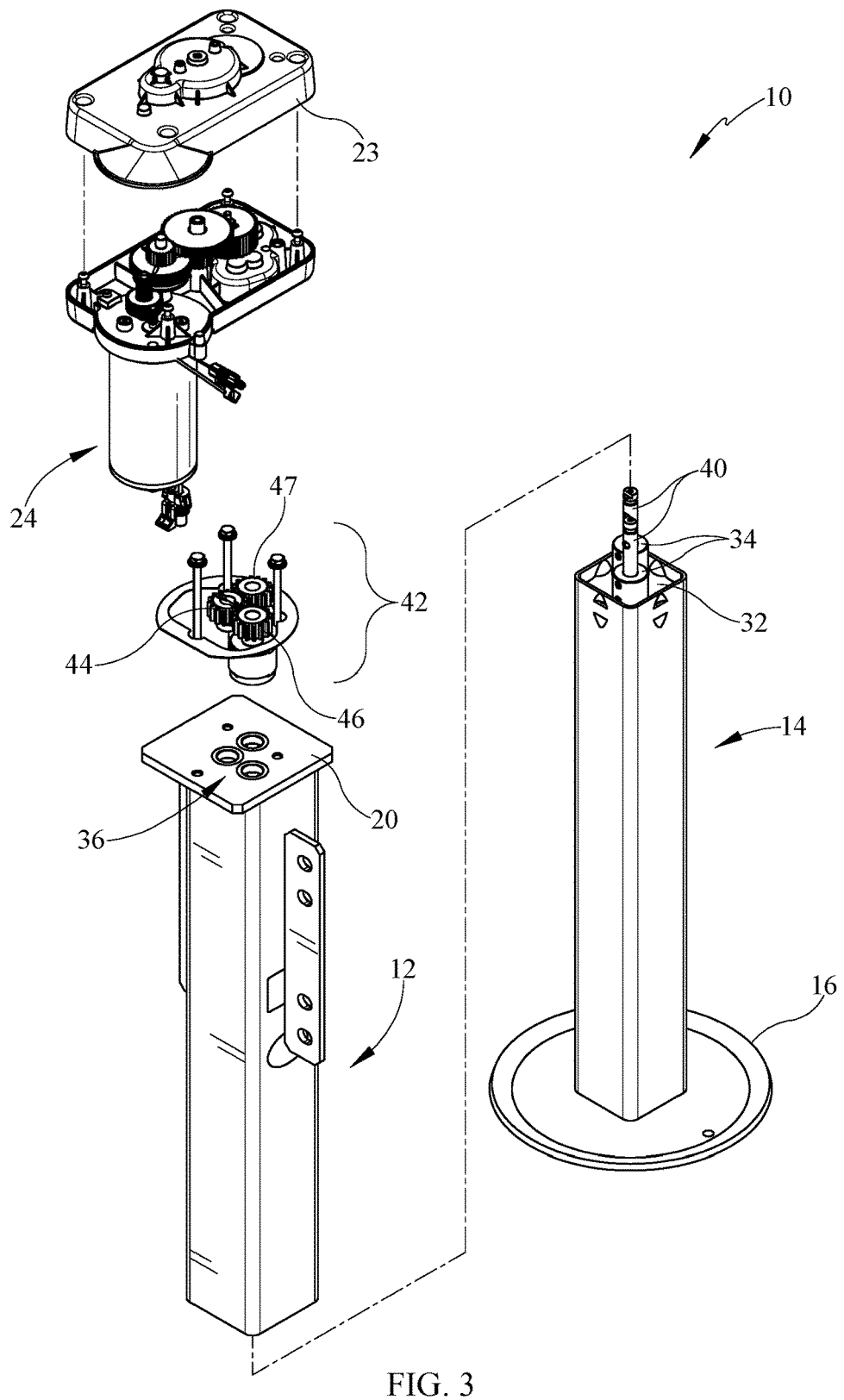
FIG. 3 is an exploded perspective view of the assembly of FIGS. 1 and 2.

Referring now to FIG. 3, an exploded perspective view of the exemplary jack leveling apparatus 10 is shown. At the lower end of the figure, is the second leg 14. The second leg 14 is the moveable leg of the exemplary assembly and slides within the first leg 12. At the bottom of the second leg 14 is the foot 16.

Near the top of the second leg 14 is a plate 32. The plate 32 may be fully external to the leg 14, such as at the top edge of leg 14, or may be partially recessed as shown. The plate 32 is fixed to the second leg 14 and causes movement of the second leg 14. The plate 32 includes at least one aperture for an actuator 40 to pass through. The actuator 40 of the present embodiment may be a rotating threaded rod. The plate 32 may include a washer or other threaded structure which receives the actuator 40 and allows for guided movement of the actuator 40 to cause movement of the second leg 14 relative to the actuator 40. In the existing embodiment, the plate 32 includes fixed nuts 34 which extend through the plate 32 and receive the actuators 40, for example threaded rods. The rotation of the rods which are fixed in vertical space, causes vertical movement of the second leg 14 relative to the first leg 12.

The plate 32 may comprise a fixed nut 34 also passing through the plate 32 or connected to the plate 32 at the aperture. According to some embodiments, the fixed nut 34 receives the actuator 40 so that when the actuator 40 rotates, the nut 34, the plate 32 and leg 14 move up or move down depending on the direction of rotation. In some embodiments however, it would be possible to actuate movement of the nut 34 in order to move the leg 14 up and down a fixed threaded rod, for example.

In the instant embodiment, two actuators 40 are shown. The at least one actuator 40 may be various numbers of actuating structures, not limited to a single feature but may alternatively include multiple features as depicted.

Disposed at the upper end of the first leg 12 is the mounting plate 20. The mounting plate 20 may include one or more apertures 36 which receive the at least one actuator 40. When assembled, the at least one actuator 40 extends through the at least one aperture 36 for engagement with lower drive portion 42 of a drive 22 to create rotational movement of the actuator 40 and cause operation of the jack leveling apparatus 10.

Positioned above the plate 20 and engaging the at least one actuator 40 is a drive portion 42. In reality, the drive portion 42 is a part of the drive 22 but the drive portion 42 is spaced from the primary drive located within the drive housing 23. In some embodiments, the drive portion 42 may include a clutch to limit load on the motor beyond a predetermined threshold. In some embodiments, the drive housing 23 may include a recess 25 (FIG. 4) to hide the drive portion 42 from view or unintended engagement. The drive portion 42 includes an at least one input 44 and at least one output 46. Some embodiments utilize a gear input and gear output, however, alternate embodiments may include a chain sprockets, belt sheaves, or other transmission type. In the exemplary embodiment, there are two output gears 46, 47 which correspond to the two actuators 40. Each actuator 40 is received by a respective output gear 46, 47 for rotation. When input torque is applied to the input gear 44, this causes rotation of the output gears 46, 47. In turn, by connection, the at least one actuator 40 rotates. Since the actuators 40 do not move vertically, the second leg 14 moves vertically along the actuator 40 during the rotation.

Above the drive portion 42 is a drive housing 23. The drive housing 23 includes the drive 22 which includes multiple gears therein. As previously described however, the drive 22 may alternatively be defined by a belt drive, chain drive, gear drive or direct drive. Any of a plurality of these non-limiting examples may be utilized as a transmission between the motor 24 and the actuator 40.

Figure 4:
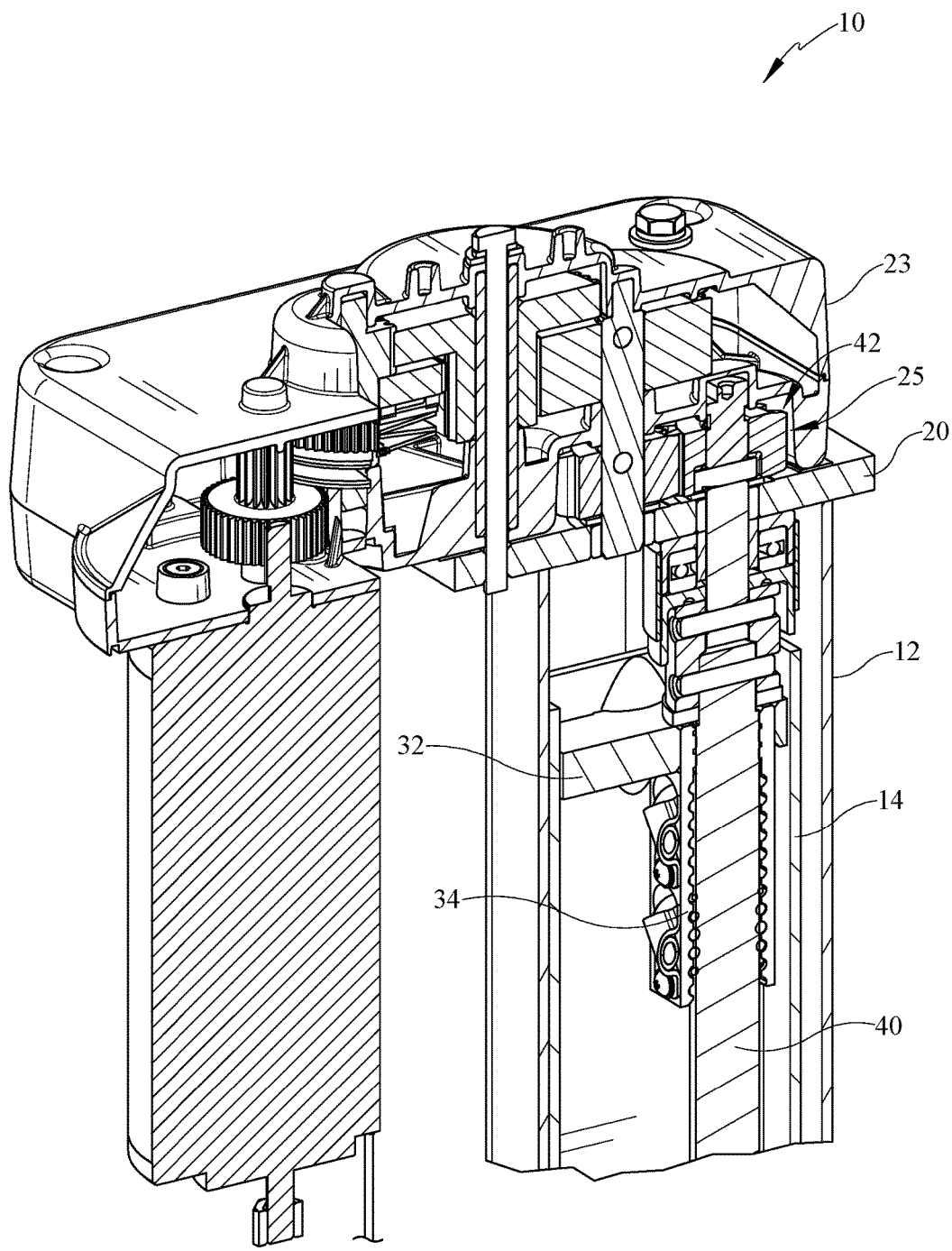
FIG. 4 is a section view of the motor and drive assembly of the jack level of FIG. 1.

Referring now to FIG. 4, a section view of an upper portion of the jack leveling apparatus 10 is depicted. The jack leveling apparatus 10 includes the drive housing 23 which has the lower recess 25 wherein the drive portion 42 is positioned.

Beneath the drive housing 23 is the mounting plate 20 and depending from the mounting plate 20 is the first leg 12. The first leg 12 is hollow such that the second leg 14 may be positioned within the first leg 12 and vertically moveable therein. The second leg 14 includes the plate 32 which is extending across the second leg 14 and allows for positioning of the at least one nut fixed 34 and the at least one actuator 40 therethrough.

In this view, one of the fixed nuts 34 is shown such that it receives one of the actuators 40. The fixed nut 34 may be embodied by a nut with threads. Alternatively, the fixed nut may be embodied by a structure which is a ball screw and which includes a plurality of grooves and such that the actuator 40 also includes grooves and ball bearings may be placed between the nut portion and the rod portion of the ball screw. Alternatively, these engagement structures may be defined by threads. These threads may be continuous or may be discontinuous and may be formed in a variety of shapes and at a variety of angles depending on the speed of movement desired and the amount of torque needed. Various alternatives may be utilized including, but not limited to, a crank or rack and pinion, or other structures which may, for example, convert rotary to linear motion.

Figure 5:
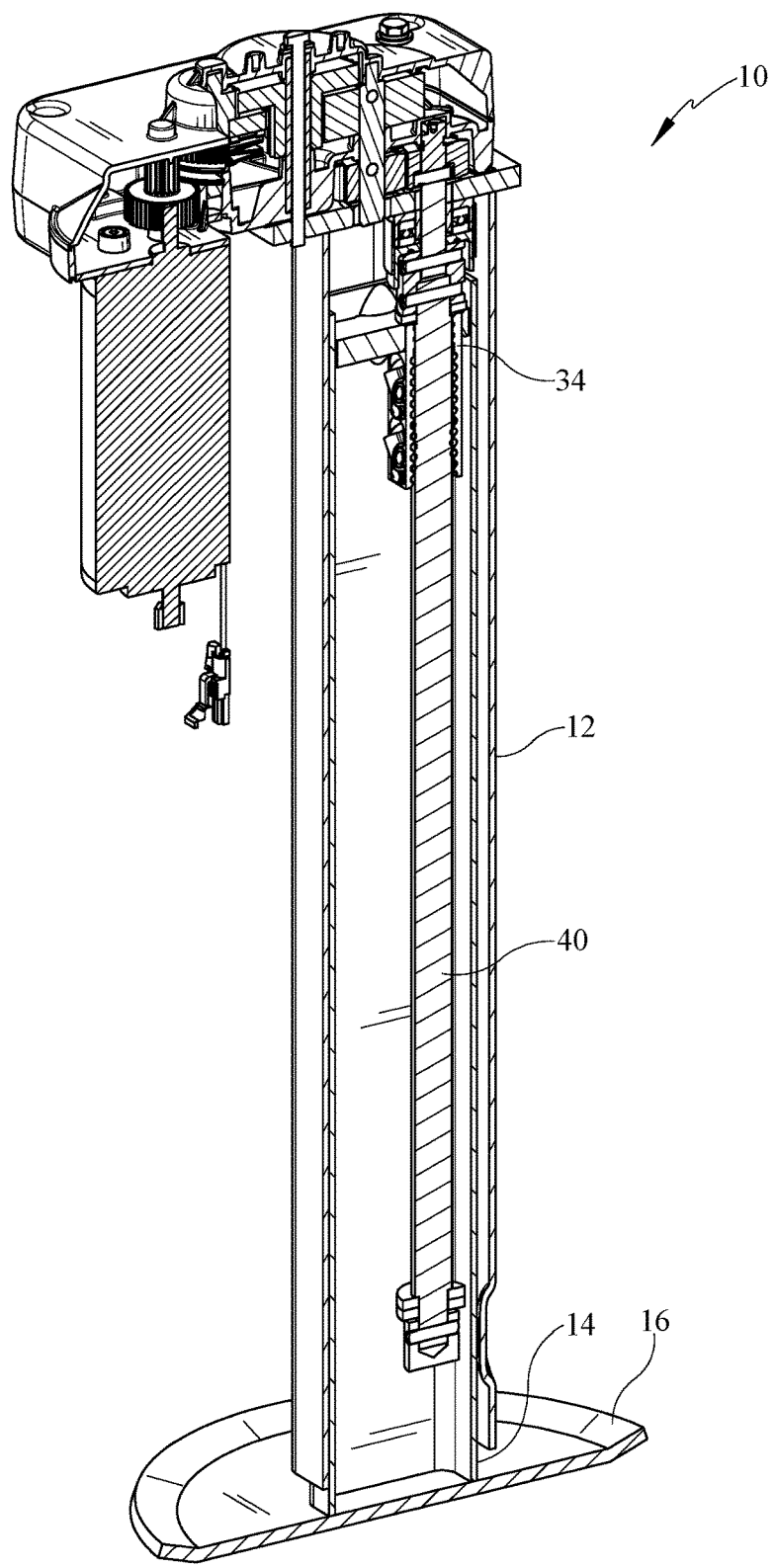
FIG. 5 is a sectioned perspective view of the apparatus of FIG. 1 in a retracted position
Figure 6:
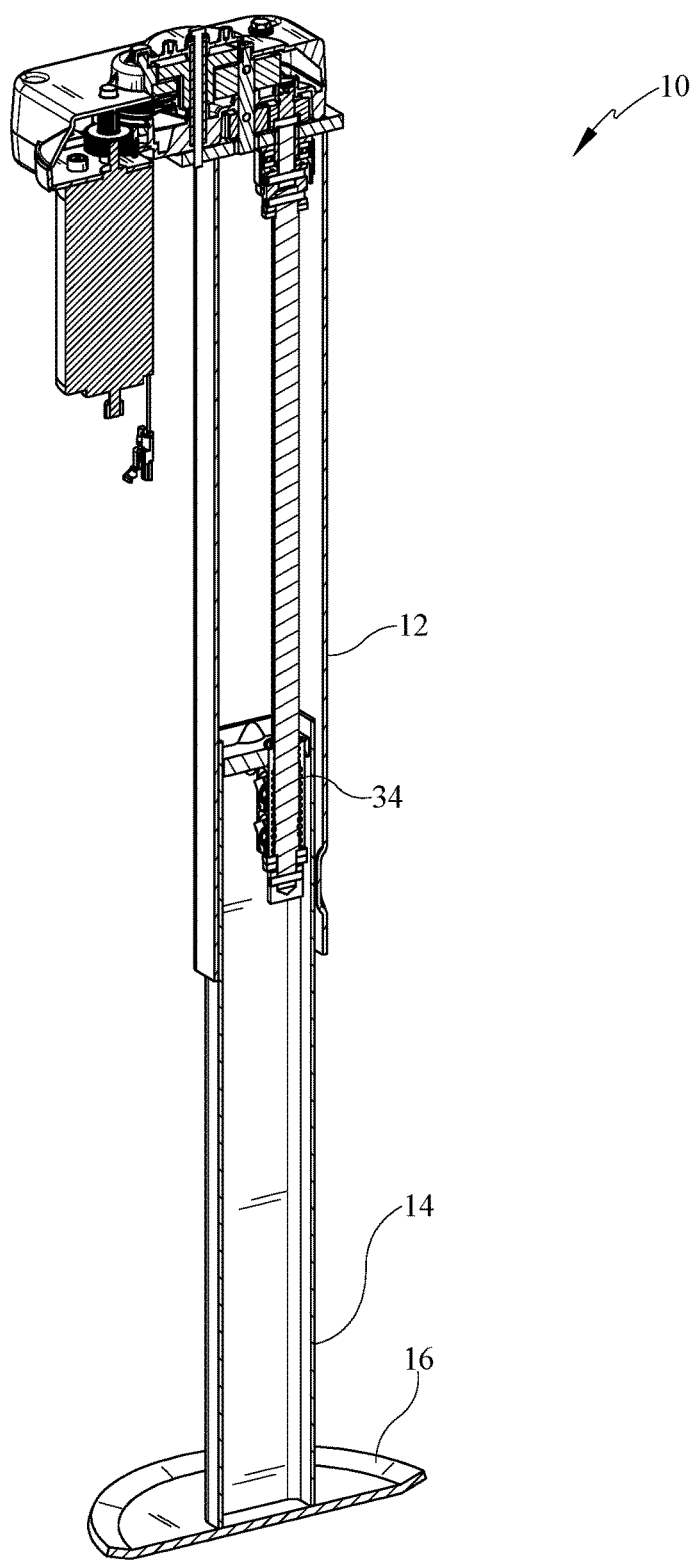
FIG. 6 is a sectioned perspective view of the apparatus of FIG. 1 in an extended position.

Referring now to FIG. 5 and FIG. 6, the jack leveling apparatus 10 is shown in two positions. According to FIG. 5, the second leg 14 is retracted in a position where the second 14 and the foot 16 are lifted above the ground. In this position the jack leveling apparatus 10 may be actuated to move the foot 16 toward engagement with the ground. According to the embodiment of FIG. 6, the structure is shown in an extended position where the foot 16 may be spaced further from the first leg 12 and engaged with the ground for application of load to level the camper. In this view the second leg 14 is fully extended relative to first leg 12. During operation, it is clear from these views that the fixed nut 34 moves along the actuator 40 causing the movement of the second leg 14 relative to the first leg 12.

Figure 7:
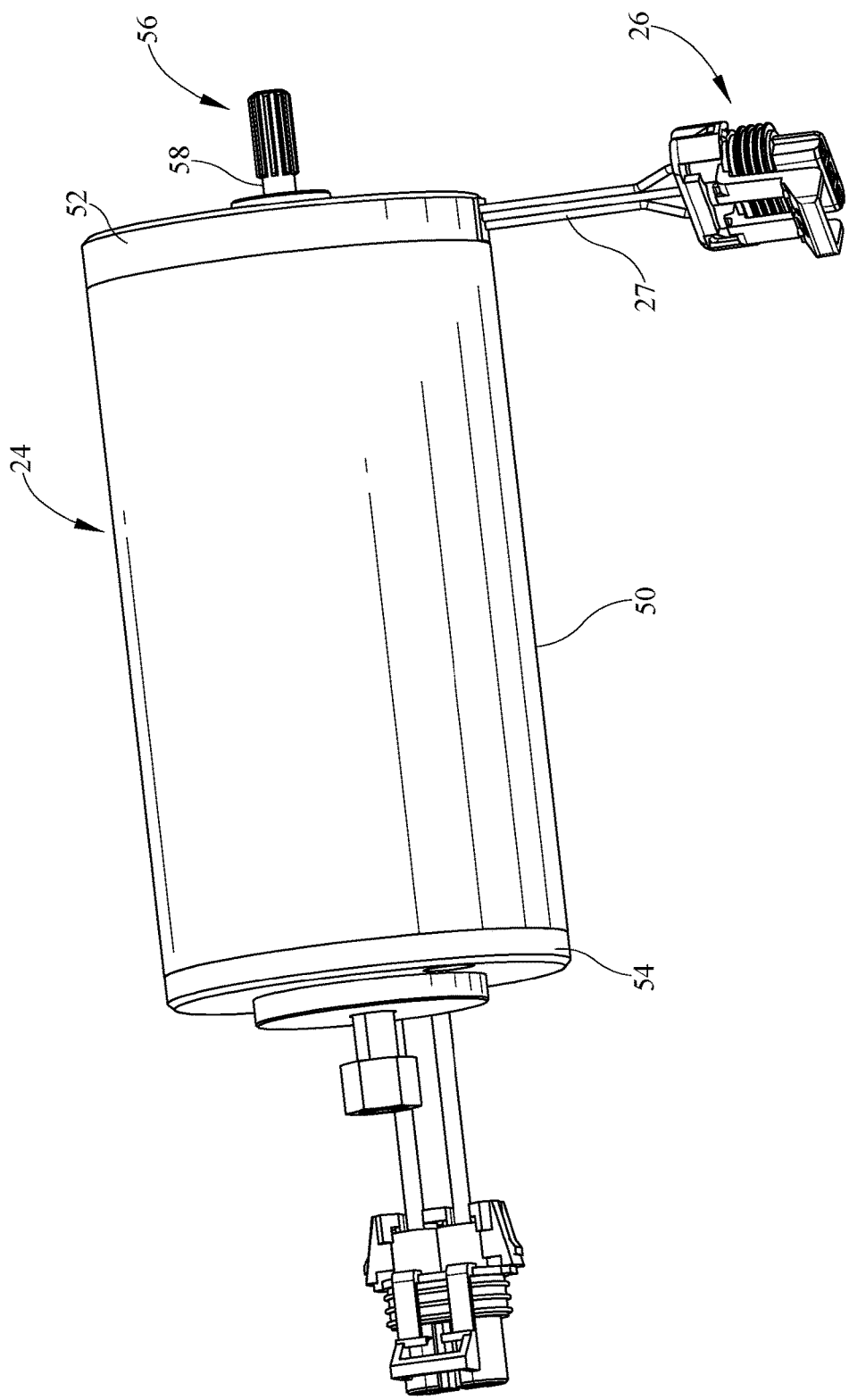
FIG. 7 shows an exemplary motor which may be utilized with the jack leveling apparatus.

Referring now to FIG. 7, a perspective view of an exemplary motor 24 is provided. The motor 24 includes a housing with a first end plate 52 and a second end plate 54. The motor 24 may be electric or fluid driven. The motor 24 also includes a housing 50 which extends between the first and second end plates 52, 54. Extending from the motor first end plate 52 is a key 56. The key 56 may alternatively be embodied by a pinion gear, either of which are connected or integrally formed on a motor shaft 58. Also shown in FIG. 7 is the first quick connector 26 which provides electrical communication with a sensor 66 (FIG. 8) located within the motor 24, according to the instant embodiment. At least one wire 27 extends between the first quick connector 26 and the sensor 66 located within the motor 24.

Figure 8:
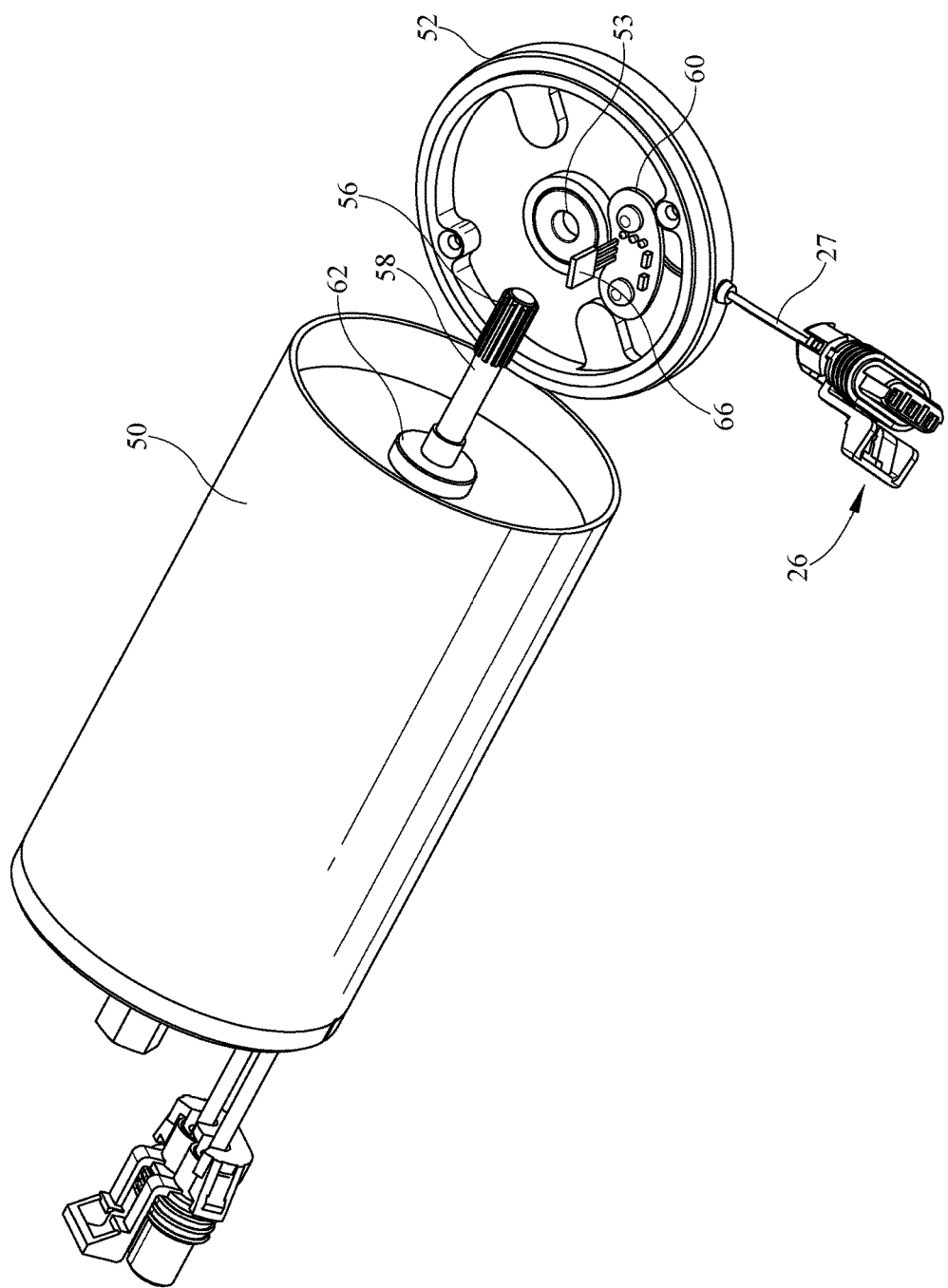
FIG. 8 is a partially perspective view of the motor of FIG. 7 with an end cap removed to depict the Hall effect sensor and opposite magnet therein.

Referring now to FIG. 8, an alternate view of the motor 24 is shown with the first end plate 52 removed. The end plate 52 is shown having a central aperture 53 through which the motor shaft 58 and the key 56 extend. The end plate 52 includes a circuit board 60 to which the first quick connector 26 and wires 27 are electrically connected. Also shown in the top is a magnet ring 62 which is located along the motor shaft 58. The magnet ring 62 is a circular shape and includes one or more magnets embedded within the material defining the ring. In other embodiments, one or more magnets may optionally additionally or alternatively be coupled to an exterior surface of the magnet ring 62. When the top end plate 52 is positioned on the motor housing 50, the sensor 66 is located on the circuit board 60 and positioned adjacent to the magnet ring 62 for sensing when the magnet 64 (FIG. 9) passes the sensor 66 located on, for example, the circuit board 60.

Each time the magnet 64 (FIG. 9) within the magnet ring 62 passes the sensor 66, the sensor 66 generates an output (e.g., a signal or pulse) that is sent (optionally after filtering or otherwise conditioning the output) to the controller 70 (FIG. 13) by way of the first quick connector 26. As described herein, the controller 70 (FIG. 13) utilizes a quantity of received outputs from the sensor 66 and/or rate(s) of received outputs from the sensor 66 to control one or more operational components of the jack leveling apparatus 10, such as the motor 24. For example, the controller 70 may stop the motor 24 when the rate of received outputs over a recent period of time satisfies a threshold value. For instance, the controller 70 may stop the motor 24 when the rate of outputs over the last X (e.g., 0.2, 0.5, 1.0, or other value) seconds is less than a first threshold value and/or when the rate of outputs over the last X seconds has changed by at least a second threshold value as compared to the rate of outputs over an earlier period of time. As another example, the controller 70 may stop or adjust the speed of the motor 24 based on the count of received outputs. For instance, the controller 70 may compare the number of counts to a number of counts associated with a fully extended or fully retracted position of the jack leveling apparatus 10 and stop and/or adjust the speed of the motor 24 when the motor 24 is at, or within a threshold distance of, the fully extended and/or fully retracted position. In some embodiments, the controller 70 utilizes the quantity of received outputs from the sensor 66 and/or rate(s) of received outputs from the sensor 66 during a learning mode to learn the number of counts associated with a fully extended and/or retracted position of the jack leveling apparatus 10.

Figure 9:
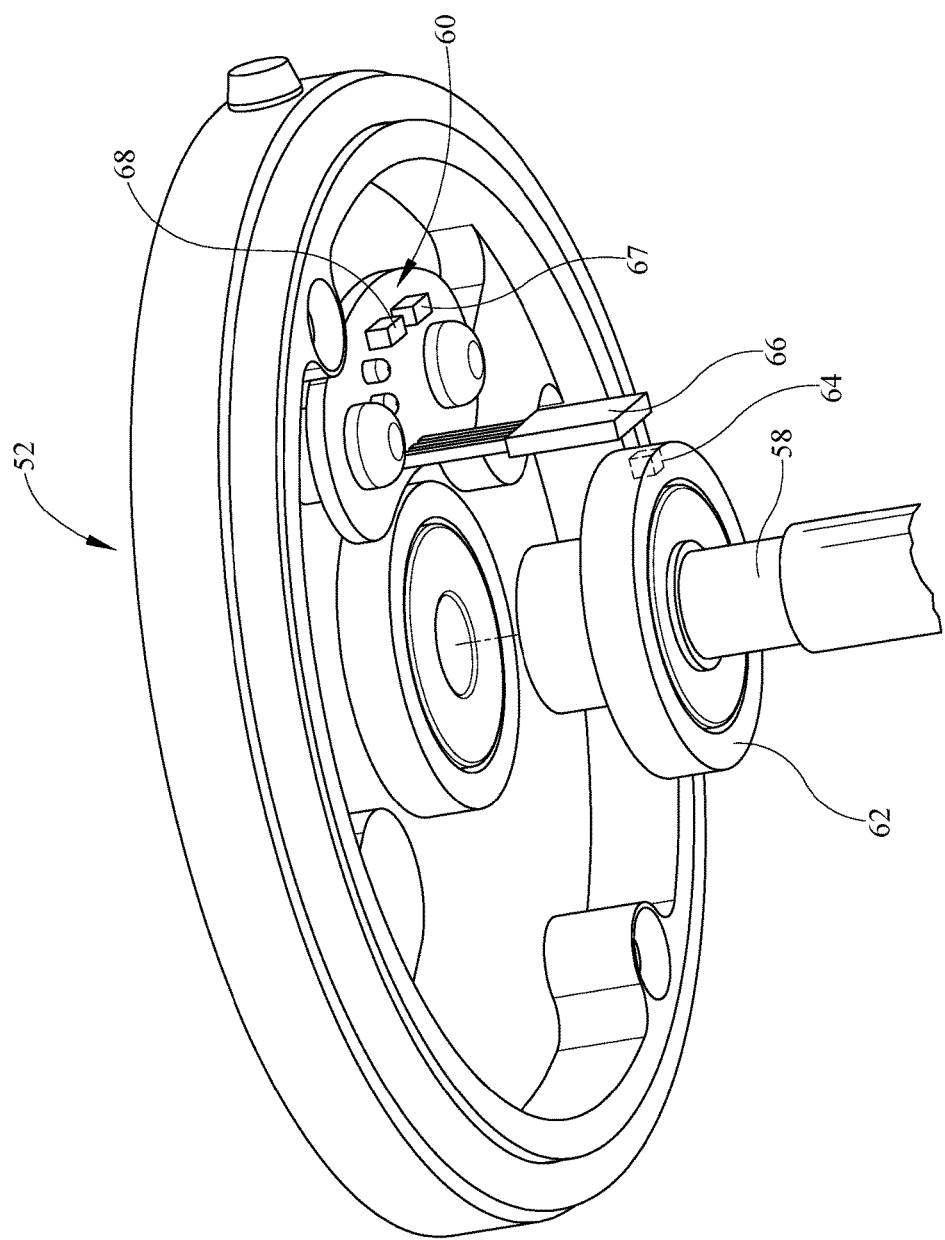
FIG. 9 is a perspective view of the end cap to show interaction of the sensor and magnet within the magnet ring.

Referring now to FIG. 9, the magnet ring 62 is shown positioned adjacent to the circuit board 60. The circuit board 60 comprises a capacitor and resistor 67, 68 which are used to filter the signal of noise or other artifacts. The circuit board 60 also includes an integrated circuit sensor 66. The sensor 66 may comprise a Hall effect sensor which generates an output that is dependent on whether it senses at least a threshold magnetic field. For example, the sensor 66 may generate a first output (e.g., a logic high or low) when it senses the threshold magnetic field and may generate a second output (e.g., the other of a logic high or low) when it does not sense the threshold magnetic field. In some embodiments, the sensor 66 may generate more than two outputs, such as a plurality of outputs whose value is dependent on the strength of a sensed magnetic field. When the motor shaft 58 and the magnet ring 62 rotate, the sensor 66 generates an output that indicates the presence of at least a threshold magnetic field each time the magnet 64 within the magnet ring 62 passes thereby. While one magnet 64 is shown, in some embodiments more than one magnet may be embedded in the magnet ring 62 and further, the spacing of the magnets may be equal or non-equal. Further, while this examples are shown at motor end plate 52, the sensor and magnet 64 may be located at various positions where rotation or other movement is occurring and where there is an adjacent stationary part to mount either the sensor 66 or the magnet 64.

With reference now to FIGS. 7-9, additional description of the controller 70 and the sensor 66 is provided. According to some embodiments, the sensor 66 may be a Hall effect sensor that detects changes in magnetic field. An opposed magnet 64 is located in the ring 62 such that upon rotation, the magnet 64 passes the sensor 66 and the sensor detects a change in magnetic flux density. When the magnetic flux density exceeds a threshold value, the sensor 66 generates an output that indicates the magnetic flux density exceeds the threshold value. The threshold value may be associated with, or correspond to, the passing of the magnet 64 by the sensor 66. In other words, the sensitivity of the sensor 66 may be selected based on the strength of the magnet 64, the spacing between the sensor 66 and the magnet 64 as it passes thereby, etc.

In some embodiments, the output of the sensor 66 that indicates the magnetic flux density exceeds the threshold value may be an output voltage that is different than a normal voltage which is output from the sensor 66. For example, the normal voltage that is output from the sensor 66 may be a first voltage and the output that indicates the magnetic flux density exceeds the threshold value may be a voltage greater than the first voltage or in the alternative, the sensor 66 may have a normally zero voltage output and the output that indicates the magnetic flux density exceeds the threshold value may be some voltage greater than zero. In further embodiments, the sensor 66 may have a normal output voltage and the passing of the magnet causes the output to drop to zero or other lower output voltage temporarily. In still further embodiments, the normal output may be a first analog or digital signal (e.g., a first series of bytes) and the output that indicates the magnetic flux density exceeds the threshold value may be a second analog or digital signal (e.g., a second series of bytes). In any of these embodiments, the result is a pulse of some output in response to the magnet 64 passing by the sensor, which is either conditioned or directly provided to the controller 70. The conditioning may occur for example by the capacitor and resistor 67, 68. Other structures may be utilized. In the depicted embodiments the rotation of the motor shaft 58 causes rotation of the magnet 64. In some embodiments, the sensor 66 may produce a first output in response to sensing passing of the magnet 64 in a first direction and may produce a second output in response to sensing passing of the magnet 64 in a second direction. For example, the first and second outputs may be a positive voltage or a negative voltage depending on the sensed direction of rotation. For instance, the system may have three voltages including a first voltage representing a first direction, a second voltage representing a second direction, and a third voltage equaling no magnet sensed.

The sensor 66 and the magnet 64 are shown mounted in the motor. However, the sensor 66 and magnet 64 may be mounted in a variety of locations wherein one part is moving relative to a second part. Moreover, while the exemplary motion is shown as rotational, linear motion may alternatively be utilized if multiple sensors are used to depict linear movement of a magnet, or vice-versa. For example, multiple positionally offset sensors may be utilized and may each provide output to the controller 70 as a linearly moving magnet passes thereby. Also, for example, multiple positionally offset magnets may be utilized and a sensor may provide an output to the controller 70 as each linearly moving magnet passes thereby.

Still further, the leveling systems may utilize one or more magnets 64. For example, a plurality of magnets may be spaced around the magnet ring 62 at equal spacings or at differing spacings, as will be discussed relative to FIGS. 10a-10d. In some embodiments, providing a plurality of magnets around the ring 62 may enable the controller 70 to determine the direction of rotation based on output provided by the sensor 66. For example, three or more magnets may be spaced around the magnet ring 62 with the circumferential distance between each adjacent pair of the magnets being different than the circumferential distance between the other adjacent pairs of the magnets. The controller 70 may determine the direction of rotation based on analysis of the time differences between a series of consecutive outputs from the sensor 66. For instance, assume magnets 1, 2, and 3 are circumferentially arranged in that order and that the circumferential distance between magnet 1 and magnet 2 is 0.25 inches, the circumferential distance between magnet 2 and magnet 3 is 0.5 inches, and the circumferential distance between magnet 3 and magnet 1 is 0.75 inches. When the ring 62 is rotating in a first direction the relative time differences between three consecutive received outputs will look different than the relative time differences between three consecutive received outputs when the magnet ring 62 is rotating in the opposite direction. For instance, in a first direction magnets 1, 2, 3, will repeatedly trigger the output of the sensor 66 in that order and the time differences in consecutive outputs will be repeat a pattern of two increasing time differences (due to the increasing distances of 0.25, 0.5, 0.75), then one decreasing time difference (due to the distance of 0.25 following the distance of 0.75). On the other hand, in the second direction magnets 3, 2, 1, will consecutively trigger the sensor 66 in that order in that order and the time differences in consecutive outputs will be repeat a pattern of two decreasing time differences (due to the decreasing distances of 0.75, 0.5, 0.25), then one increasing time difference (due to the distance of 0.75 following the distance of 0.25). The controller 70 may utilize these differences in the two different directions to determine a direction of rotation. For example, the controller 70 may compare time differences between consecutive received outputs to forward and reverse direction profiles and determine to which profile the time differences conform.

In embodiments in which the controller 70 determines direction of rotation, other techniques may be utilized to determine the direction. For example, the sensor 66 may be configured to provide output that indicates direction. Also, for example, two sensors 66 may be arranged next to one another and may both provide output to the controller 70. The controller 70 may determine the direction based on the order in which outputs are received from the two sensors.

As outputs are generated by the sensor 66 in response to rotation of the magnet 64 relative to the sensor 66, the outputs are monitored by the controller 70 (FIG. 13). The controller 70 (FIG. 13) receives the outputs in the form of a series of pulses that are stored by the controller, optionally in combination with time values that each indicate a time (an absolute time or a time relative to a previous pulse) when a respective pules was received. In some embodiments, the controller 70 may count the number of pulses. Further, by determining the number of pulses over a period of time, the controller 70 may determine the rate of pulses over that period of time may be determined. Rates of pulses for each of a plurality of periods of time may be stored or recorded by the controller, for example in the form of a lookup table and when a rate changes, the controller 70 (FIG. 13) can associate the change of rate with a condition of the jack leveling apparatus.

In operation, the controller 70 (FIG. 13) may use the counted pulses to determine a location of the foot 16 for example. For example, the controller 70 (FIG. 13) may be programmed to determine how the rotations of the motor 24 relate to the distance traveled by the foot 16.

The controller 70 (FIG. 13) may also be used to determine distance traveled. The controller (FIG. 13) may also determine the location of the foot 16 relative to a fully extended position and a fully retracted position. For example, the controller 70 may be programmed to know the number of counts between fully extended and fully retracted, and by comparing the number of counted pulses to the number of counts between fully extended and fully retracted, may determine a percentage of distance between either the fully extended or fully retracted positions. This could occur for example by taking the difference of the actuator location count and the fully retracted or fully extended position and dividing by the total travel count, wherein the total travel count is the number of counts between the fully extended and the fully retracted positions. In such embodiment, the location of the actuator may also be determined without pre-programming or knowing a predetermined length, or additionally or alternatively may have a learning mode to perform this process automatically or partially automatically. For example, in the learning mode for the controller 70, the foot 16 may start in a retracted or extended mode. Then the motor 24 may adjust to the other of retracted or extended positions, until the threshold rate change is detected. The controller may count the number of pulses between the fully extended and fully retracted positions. Within that range, the controller 70 may also determine rate changes that occur to further determine when the jack leveling apparatus is either loaded or unloaded.

Moreover, the controller 70 (FIG. 13) can be configured to determine change of rate of the counts. When the motor 24 is moving with little or no load, the count rate from two or more consecutive pulses over time may be relatively fast. When a load is applied however, the speed of the motor 24 may be reduced. As the load is increased, the rate of rotation decreases due to increase in force and torque. Thus speed is inversely proportional to the torque being applied by the loading. Consequently, the rate of pulses will be reduced as the load is increased. Thus, the controller 70 may compare a recent count rate to a less recent count rate to determine when a load is being applied to the jack leveling apparatus 10. For example, the controller 70 may determine a load is being applied when the count rate over the last X seconds varies by at least a threshold value from an earlier in time period of time (that may optionally include a subset of the last X seconds). Still further, the change of rate may determine whether a load is relatively higher or relatively lower. At stall (no pulses) or erratic change of rate or direction, a full retraction or extension may be indicated.

With reference now to FIG. 10a-10d, a plurality of examples are provided to discuss arrangement of magnet 64 and Hall effect sensor 66. With reference first to FIGS. 10a and 10b, a linear arrangement of magnets 64 is shown. In FIG. 10a, the magnets 64 are shown in linear spacing and may move in either direction as depicted by the double-headed arrow. The magnets 64 are spaced apart equally. The Hall effect sensor 66 is stationary, but in alternative embodiments for any of the depicted embodiments, the sensor 66 may be mobile and the magnet(s) 64 may be fixed. With reference to FIG. 10b, the magnets are spaced apart unequally, which may be beneficial for various reasons including, but not limited to, determining the direction of movement of the magnets 64, and therefore motor 24 or other part of the jack leveling apparatus 10. Again, in this example, the magnets may move in two directions linearly.

With reference to FIGS. 10c-10d, instead of linear motion, the motion is circular in nature as indicated by the double-headed arrows. In the embodiment of FIG. 10c, the magnets 64 are also spaced apart equally and opposite to the sensor 66. However, with reference to FIG. 10d, the magnets 64 are spaced apart at unequal distances, so as to provide an easy means for determining direction of rotation of the magnets 64.

Figure 11:
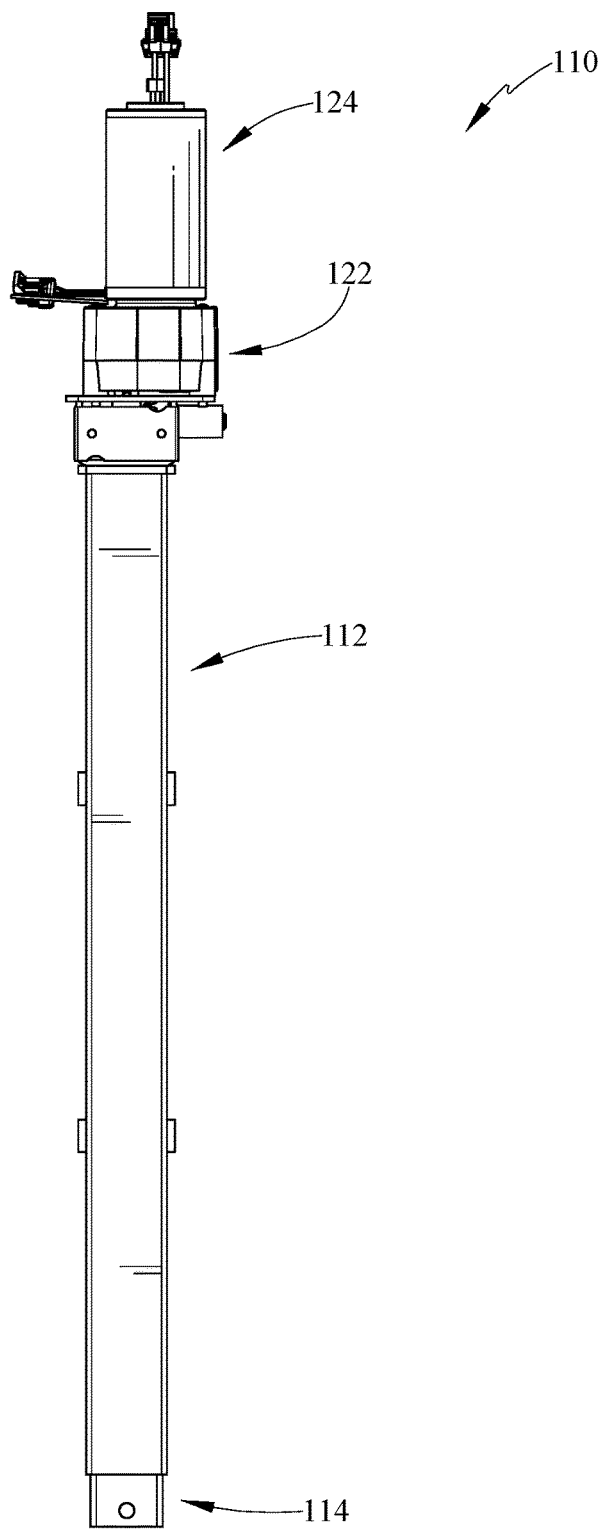
FIG. 11 is a perspective view of an alternate jack leveling apparatus.

With reference now to FIG. 11, a side elevation view of an alternative embodiment of a jack leveling apparatus 110 is depicted. The motor 124 is positioned above the drive 122 rather than below as in a previous embodiment. The jack leveling apparatus 110 is more vertically oriented than the previous embodiment.

Figure 12:
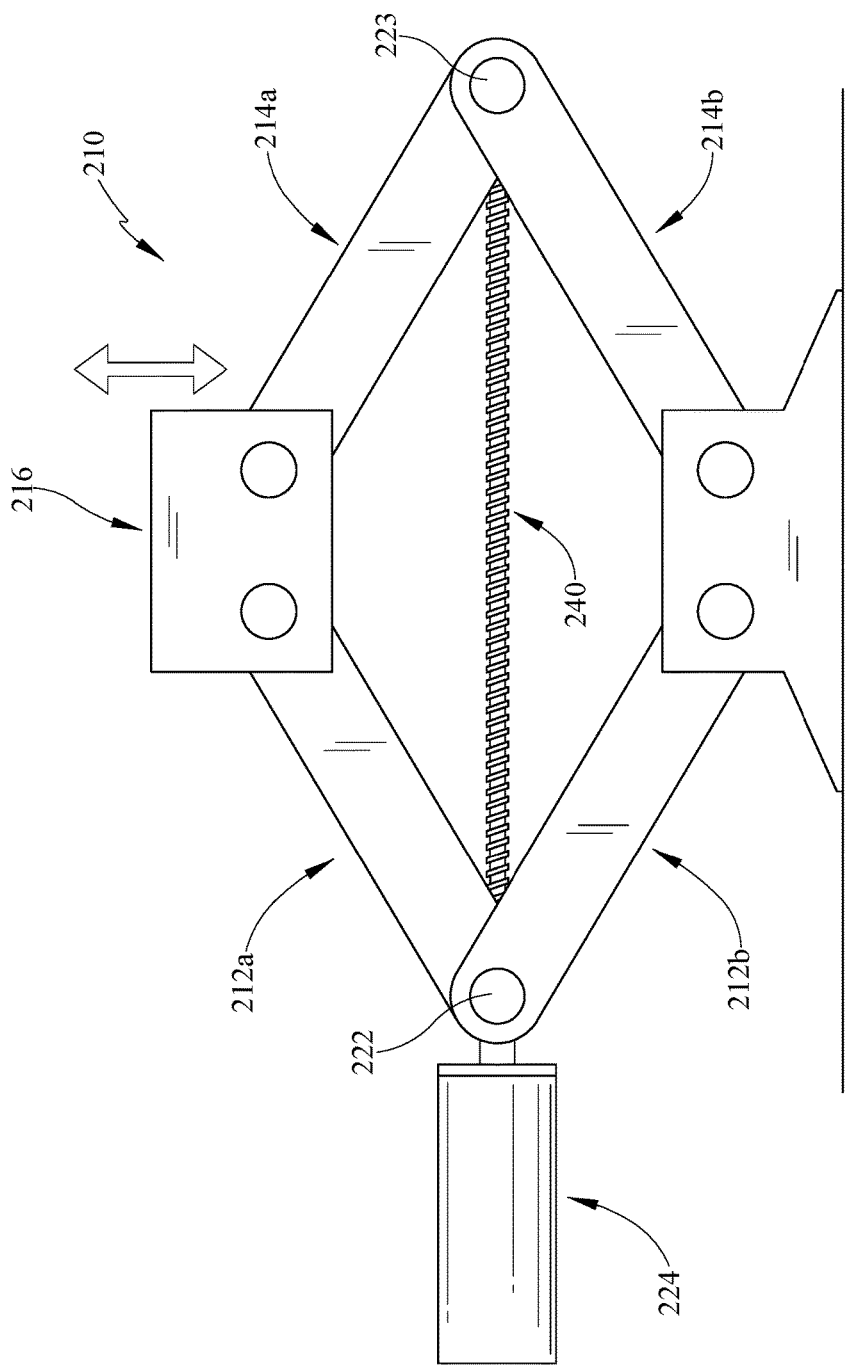
FIG. 12 is a side view of an further alternative jack leveling apparatus.

Referring to FIG. 12, a still further embodiment is provided wherein a scissor jack is provided. The scissor jack 210 includes a first leg and a second leg which move relative to one another to either expand or retract the scissor jack 210. The scissor jack 210 may include a motor 224 and actuator 240 to actuate movement for leveling. While the embodiment depicts a direct drive system, the motor 224 may also be connected by an additional drive or transmission. The actuator 240 extends between two legs 212 and 214. Each of the legs is defined by a first portion 212a and 214a and a second portion 212b and 214b. The leg portions 212a and 212b are hingedly connected at hinge drive 222 and the leg portions 214a and 214b are hingedly connected at hinge drive 223. In the depicted view, the hinge drives 222, 223 allow for movement of the leg portions connected at each hinge drive 222, 223. Further, the actuator 240 is engaged with the hinge drives 222, 223 so that rotation of the motor 224 causes rotation of the hinge drives 222, 223, which in turn causes movement of the leg portions 212a, 214a and 212b, 214b. When the legs move, a foot 216 moves up or down as shown by the double headed arrow, depending on the direction of the motor 224 rotation, to either raise or lower the foot 216 for leveling.

Referring now to FIG. 13, a schematic view of an exemplary motor, for example motor 24, is shown connected to a controller 70. The controller 70 has a counter 72 and a clock 74. During each rotation of the motor 24, at least one magnet 64 is sensed by the sensor 66. Each sensing event is counted by the controller counter 72. Further, the clock 74 allows for time keeping to occur during the counting process. By comparing the counts or signals over a period of time, the rate of movement of the motor 24 may be determined.

Once the rate of movement is determined, various methods may be used to determine load condition of the jack leveling apparatus 10. For example, if a first rate of movement is determined, the rate may correspond to an unloaded condition. Further, a second rate of movement, for example a slower rate, may correspond to a loaded condition. By comparing the instantaneous rate to threshold levels, the controller 70 can determine loaded or unloaded condition. The controller 70 may include a lookup or other storage table so that the controller 70 may continually examine rates of movement, so as to determine a change in rate.

In another scenario, the instantaneous rate may be compared to previously recorded rates saved by the controller, so as to determine if a change in rate occurs. Further, the change in rate may be compared to threshold changes in rate to determine if loaded or unloaded condition is occurring.

Still further, the counter 72 may be used to determine position and/or direction. In some embodiments, an upper position limit may be determined when the rate or change in rate reaches a predetermined value, at which time the motor 24 may be stopped or indicate a clutch has been engaged or disengaged. Similarly, a lower limit may be determined in a similar fashion. These may be indicated by the stoppage of pulse signals, due to a clutch for example or a speed of rotation of the motor 24 beyond a preselected value. This will depend in part on the location of the magnet and sensor. For example, the sensor may be in the motor 24 as shown, and/or may be in the drive 22, and/or lower drive portion 42, and/or along the actuator 40, and/or between the legs 12, 14. Thus in some embodiments where the sensor is located before the clutch, in considering from motor toward actuator along the drive train, the motor 24 will turn slower than normal since the clutch allows the motor to turn so not to overload the circuit. However, if there is no clutch, the motor will stop.

Once an upper or lower limit position is determined by the controller 70, the controller 70 can use the counter to determine position of the jack leveling apparatus 10. That is, the position of the foot 16 or other portion of the jack leveling apparatus 10 may be determined by counting and by programming the number of turns between limit positions. The programming may be automated by the controller 70, for example in a learning mode, or may be performed manually by an installer.

Further, by knowing the drive ratio relative to the motor 24, the position of the jack leveling apparatus 10 may be determined. Alternatively, the number of rotations may be utilized to determine the position by determination of the number of counts between limits.

Figure 14:
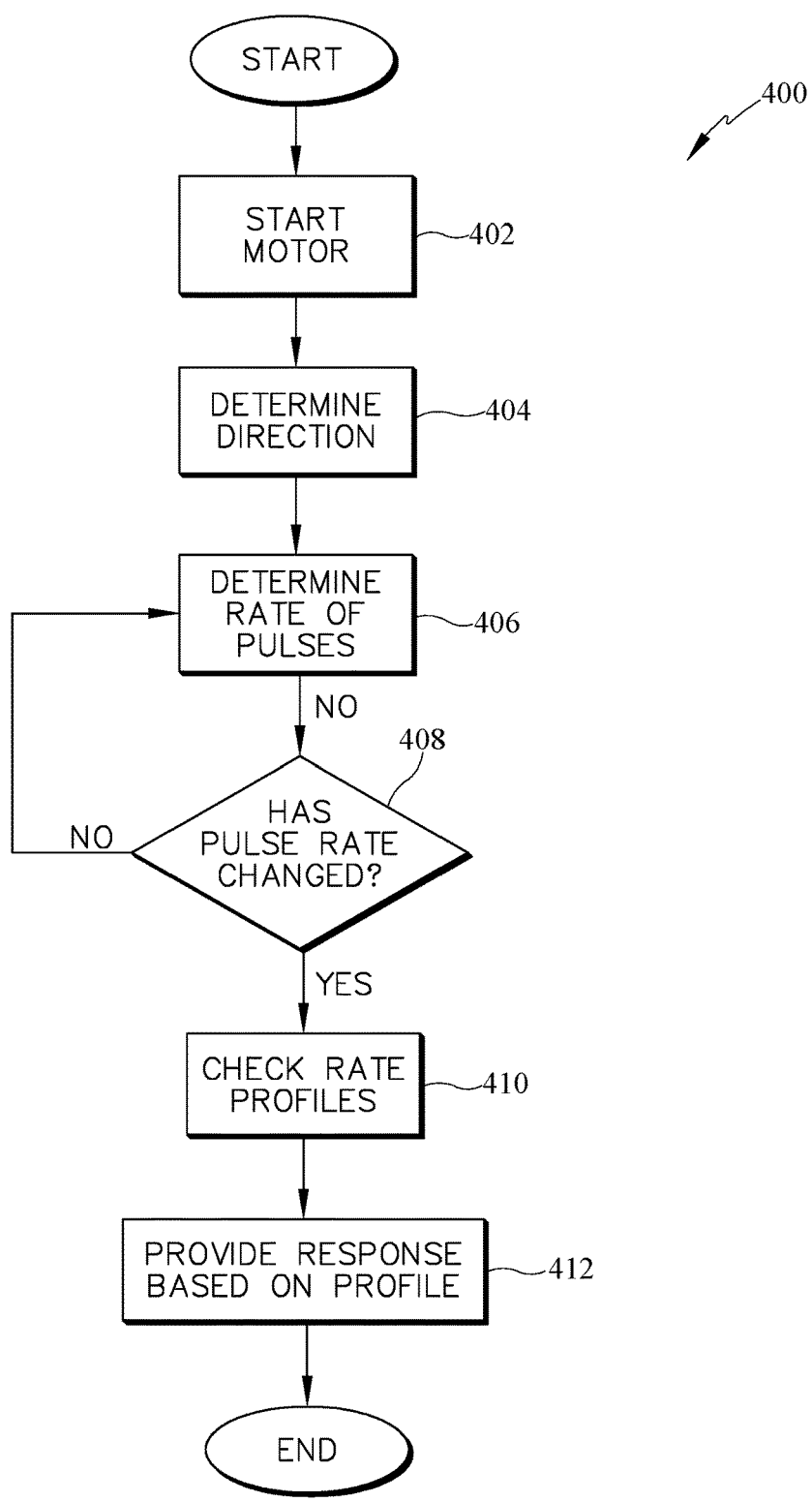
FIG. 14 is a flow chart depicting an exemplary process the controller may utilize.

Referring now to FIG. 14, a first flow chart is shown depicting a method 400 of using the jack leveling apparatus 10. According to this embodiment, the methods begins by starting the motor at step 402 and may include the step of determining direction of movement of the motor at step 404. Next, the controller 70 determines the rate of pulses at step 406. At step 408, the controller 70 make a determination of whether the pulse rate has changed. In doing this, the controller compares a previously recorded value to the most recent value to determine if a change has occurred. In another embodiment, the controller 70 may record a number of previous values and determine if a change has occurred.

If the controller 70 determines that no rate change has occurred, then the process returns to step 406 and continues determine rate of pulses and if the rate has changed. Alternatively, if the controller determines that the rate of pulses has changed, then the controller refers to a rate profile at step 410 which may be programmed or learned after installation. A rate profile may be a saved, programmed or predetermined rate value or set of values which correspond to a specific situation, such as a max load, no load, or ground engaging or disengaging situation or sequence of situations. Once the rate profile has been checked, the controller 70 provides a response in the form of an action for the motor at step 412.

Figure 15:
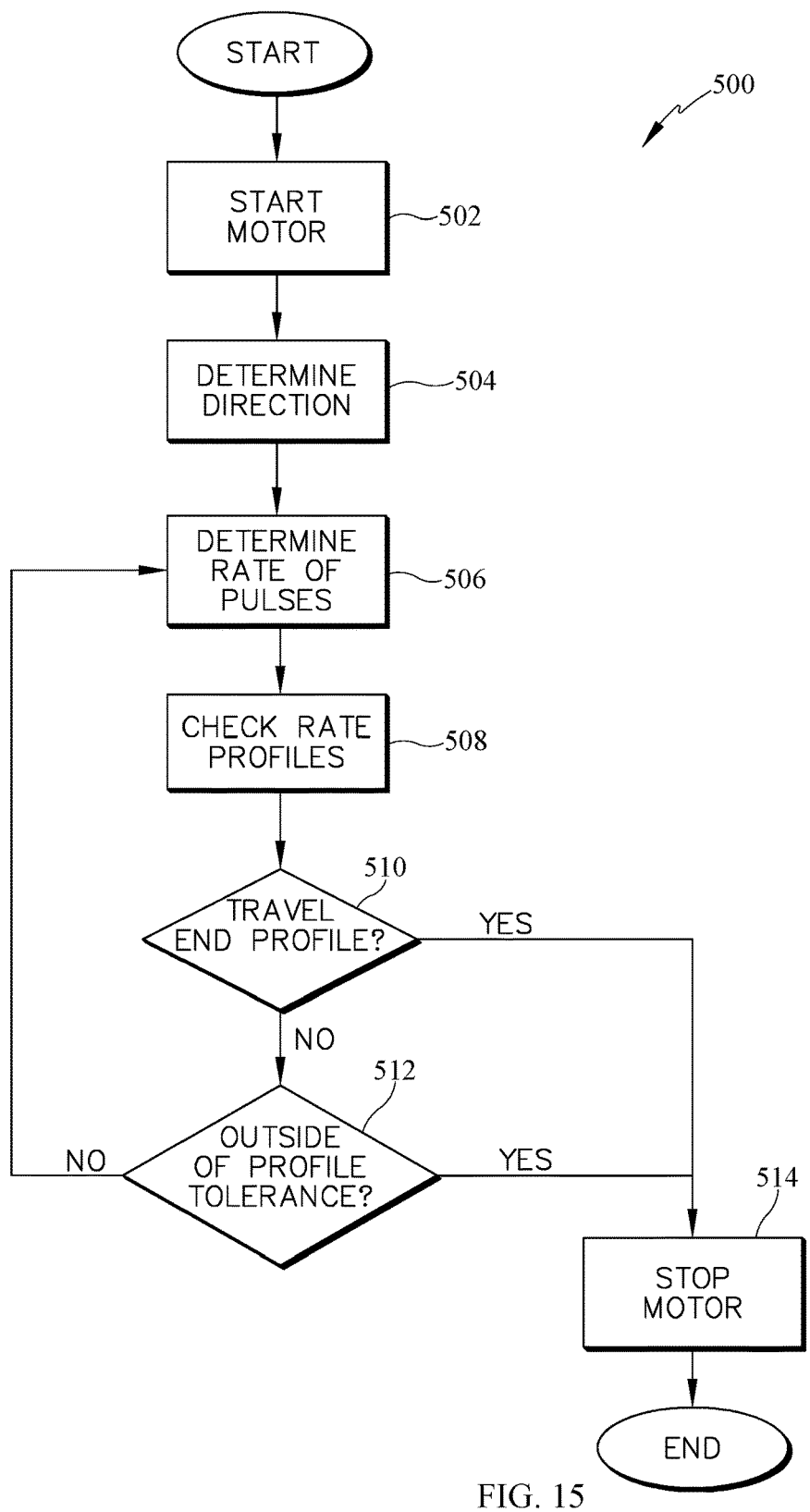
FIG. 15 is a flow chart depicting an alternative embodiment of an exemplary process the controller may utilize; and, FIG. 16 is an exemplary embodiment of a controller system.

Referring now to FIG. 15, a flow chart of a second method of using the jack leveling apparatus 10 is depicted. The flow chart provides some of the decision making which occurs in the controller 70 (FIG. 13) and therefore may apply to any of the depicted jack leveling apparatuses in the various embodiments.

In the example method of controlling a jack leveling apparatus 500, the motor is started at step 502. Next the controller 70 (FIG. 13) determines a direction at step 504. This may be determined by user input which may be to raise or lower the jack, or by patterns of the pulses sent to the controller 70 (FIG. 13), for example. Further, the step 504 may be optional but may be desirable for full leveling control to determine if the jack apparatus 10 is retracting or extending. However, the controller 70 may not necessarily control direction but instead such directional control may be due to configuration of electrical hardware such relays or other switching mechanisms.

When the motor 24 (FIG. 1) starts to rotate, the sensor 66 begins generating pulses as the one or more magnets 64 (FIG. 9) pass thereby. By comparing the number of pulses over a period of time, the controller 70 (FIG. 13) can determine a rate of pulses at step 506 and save the number of pulses, for example to a lookup or other storage table. Next the controller 70 (FIG. 13) can determine if the pulse rate changes by checking rate profiles at step 508. Alternatively, the controller 70 may determine if there is a change in the number of pulses or the controller may monitor rate change and the number of pulses. Next the controller checks if the rate of pulses indicate a travel end profile at step 510. If the answer is no then the controller proceeds to determine if the rate is outside of a profile tolerance at step 512 which might indicate a limit has been reached for example. If the answer is no the controller returns to step 506 to determine a rate of the pulses. The difference between steps 512 and 514 may be none or may be that the controller 70 is determining when the jack leveling apparatus 10 engages the ground. When multiple jacks are being extended, each jack will stop when the ground is reached, then they will move individually or in groups to level the RV, camper, trailer, etc.

Alternatively, if at step 510 the controller 70 determines that a travel end profile is met, the controller 70 may direct the motor 24 to stop at step 514. Or at step 512 if the rate is determined to be outside a profile tolerance, the motor may also be stopped at step 514.

In operation, the jack leveling apparatus 10 may be started by installing on a camper, RV or other structure to be leveled. The controller 70 may be directed to perform an automated learning process or mode wherein the leg 14 is retracted fully, if not already fully retracted. First, the controller 70 may determine motor direction. Next, the motor may reverse to fully extend the leg 14. In either direction, the controller may use the procedure of FIG. 14 to determine profiles for travel ends.

Before or after determining the upper and lower travel limits, the controller 70 may also determine direction of the motor 24 based on any of the various and non-limited manners or combinations of manners previously described. For example, if the controller 70 is programmed to know how the relays or power switch mechanisms are configured, it may provide a control signal to extend or retract and the hardware switches will control direction.

During the movement between the upper and lower limits, the controller 70 may also count the number of outputs or pulses to determine the counts between the upper and lower limits. Thus the controller determines the total number of counts between upper and lower limits to determine location of the leg 14 therebetween during operation.

Further, the controller 70 may determine change of rate in the manners previously described to determine when the motor 24 is loaded or unloaded. With this information, and the positional information determined, the controller 70 may also determine location of the leg 14 when the motor is either loaded or unloaded.

In further embodiments, at least one single or multi axis level sensor, inclinometer, accelerometer or other electronic level sensor device may be used to provide the feedback to the controller to determine the levelness of the vehicle or trailer.

Figure 16:
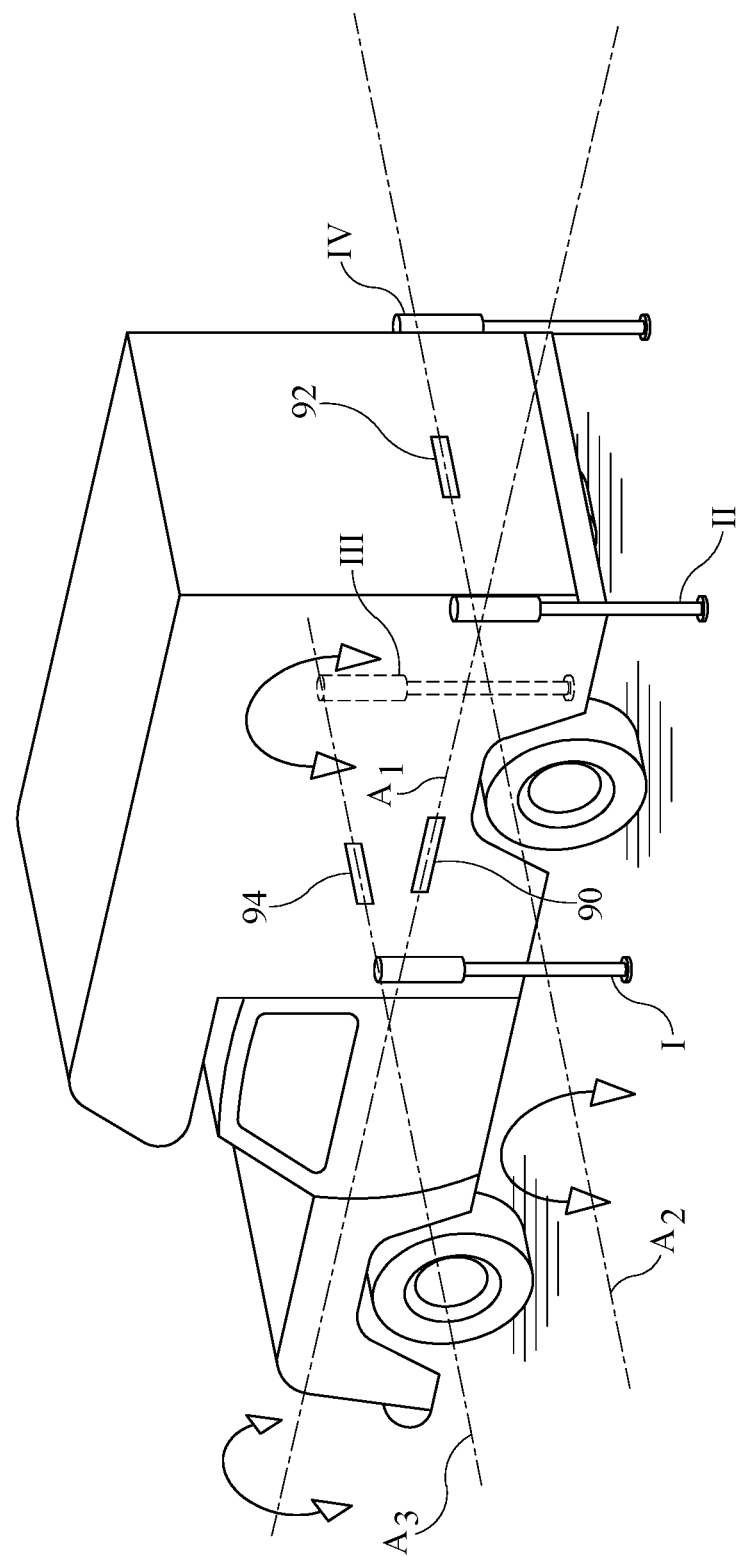

As shown in FIG. 16, a first level sensor 90 may be included in the control system. The first level sensor 90 senses the inclination of at least one axis $A_1$ in a first axis parallel to the ground. In some embodiments, the sensors may be accelerometers. For purpose of reference in this description, the jacks are labeled I, II, III, IV, wherein I and II are on the driver side of the vehicle and the jacks III (shown in broken line) and IV are on the passenger side. It may be desirable in any of the embodiments to move the jacks in pairs to limit twist along an axis, for example the lateral or longitudinal axis of the vehicle. For example, the jacks may be moved in longitudinal pairs, e.g. jacks I and II or jacks III and IV. Alternatively, the jacks may be moved in lateral pairs, I and III or jacks II and IV.

In the instant embodiment, the axis $A_1$ extends between the front and rear of the vehicle, for example. This first sensor 90 may in some embodiments measure what is commonly referred to as pitch or pitch angle, measure of rotation about a lateral axis. The pitch of the vehicle may be adjusted by movement of jacks I and III or jacks II and IV. Further embodiments of the system may have at least a second level sensor 92 in a relatively perpendicular axis to the first level sensor 90 and preferably parallel to the ground. Such exemplary axis $A_2$ is shown extending between the right and left hand sides of the vehicle. In the depicted orientation, this may be referred to as roll, measure of rotation about a longitudinal angle. In the some embodiments, the first level sensor 90 would be positioned such that it would be on or approximately parallel to axis $A_1$ but perpendicular to an axis running between two consecutive jacks. Further, the second level sensor 92 would be positioned such that it would be on or approximately parallel to axis $A_2$.

The first level sensor 90 may be used by the controller 70 to determine a level or desired inclination to the axis of the first level sensor 90 by extending or retracting one or more jacks. This would optionally be initiated once the jacks have been extended and contacted ground. In some embodiments, a first consecutive pair of jacks in the same general axis, for example I and III, approximately perpendicular to the axis of the first level sensor 90, would be actuated at the same time and operated until substantially reaching the desired inclination. In embodiments with the second level sensor 92, a second pair of jacks, for example, II and IV, in the same general axis, approximately perpendicular to that axis of the first level sensor 90 would operate until substantially reaching the desired inclination in the axis of the second level sensor 92. The first and second level sensor 90, 92 may be two axes of a multi axis level sensor. The axis $A_2$ may be raised or lowered by moving the pair of jacks II and IV. The leveling of second level sensor 92 may be adjusted by moving jacks II and IV individually.

In another embodiment, a third level sensor 94 may be utilized to prevent twist in the vehicle or trailer chassis. Twist is a differential measure about one axis between two positions. For example, the level sensors 90, 92, 94 may measure roll between a front location of the RV and a rear location. If the angle at the third level sensor 94 differs from the measurement at the second level sensor 92, the controller 70 can determine the amount of twist the RV, trailer, camper, vehicle, etc., is undergoing. The third level sensor 94 may be located in a position such that its axis is substantially parallel to a previously disclosed axis $A_2$ of second level sensor 92 that is along the axis generally parallel to the short side or lateral axis of the chassis, depending on the direction of twist. The jacks I and III along an axis $A_3$ generally parallel to the axis of the third sensor 94 and further away from the second level sensor 92 may be operated together to raise or lower the axis $A_3$ or individually to obtain the desired inclination or reduce twist about axis $A_1$. This inclination along parallel axes may be substantially the same in order to level the vehicle and remove twist. For example, limitations may be caused by calibration issues or other factors which may preclude absolute symmetry between parallel axes.

The jacks may then be operated individually to make slight changes as needed and verify that the chassis is at the desired levelness. Furthermore, the jacks may be retracted to lower the chassis closer to the ground but maintaining the desired levelness.

During operation, the level sensors 90, 92, 94 may be used to control how the jacks extend until they reach ground, stopping jacks when they do so until all jacks touch ground. Next the controller 70 may verify that all jacks are still touching the ground. This may be done by retracting and/or extending the jacks and checking a profile. Next, the jacks may lifting the lowest side of the RV, camper, trailer, vehicle, etc. up until the perpendicular axis is level or reaches a specified angle, lifting the lower of the two adjacent sides until the perpendicular axis is level or reach a specified angle. Next, the controller may verify level. Subsequently, the controller 70 may check for twist with the second parallel axis and adjust a single jack. Alternatively, for example, the controller 70 may check the twist first and make the two parallel level sensor axis have the same incline and then adjust pairs of jacks or actuators.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A jack leveling apparatus, comprising:
a fixed portion and a movable leg;
a motor which rotates an actuator to extend or retract said movable leg;
at least one magnet disposed opposite a Hall effect sensor, said magnet creating a magnetic field, causing said Hall effect sensor to create multiple pulses in response to movement of a portion of said apparatus;
wherein said Hall effect sensor senses said magnetic field and provides at least one pulse per rotation of one of said motor, said actuator, or further to movement of said movable leg responsive to said at least one magnet;
a controller having a counter which counts multiple pulses provided by said Hall effect sensor wherein said controller takes a derivative of said count during a time period to determine a rate of motion of at least one of said motor, said actuator or said movable leg;
wherein a change in the rate of motion corresponds to a change in load; and
wherein at least two rates of motion are programmed into the controller.

2. The jack leveling apparatus of claim 1, said controller being pre-programmed by an installer.

3. The jack leveling apparatus of claim 1, said controller being pre-programmed by an end-user.

4. The jack leveling apparatus of claim 1, said controller determining said at least two rates of motion and comparing the at least two rates of motion.

5. The jack leveling apparatus of claim 1, said controller further determining a fully extended or a fully retracted position.

6. The jack leveling apparatus of claim 1 further comprising a clutch disposed between said motor and said actuator.

7. The jack leveling apparatus of claim 1, said actuator being a threaded rod.

8. The jack leveling apparatus of claim 1 further comprising a level sensor for determining each of roll, twist and pitch.

9. The jack leveling apparatus of claim 1 further comprising a foot near an end of said movable leg.

10. A method of determining load on a jack leveling apparatus, comprising:
learning at least one of an upper limit and a lower limit of said jack leveling apparatus having a Hall effect sensor and a magnet, said Hall effect sensor providing an output to a controller based on movement of a portion of said jack leveling apparatus;
determining a first rate of movement of at least one of an extendable leg or a foot by said Hall effect sensor and said controller, said first rate corresponding to one of loaded or unloaded condition of said leg or foot;
determining a second rate of movement of said at least one extendable leg or foot, said second rate of movement detected by said Hall effect sensor and said controller, said second rate of movement corresponding to the other of said loaded or unloaded condition of said leg or foot; and,
determining a load condition based on comparison of said first rate of movement and said second rate of movement.

11. The method of claim 10, utilizing time between magnet passes to determine said rates of movement or a change of rate from said first rate of movement to said second rate of movement.

12. The method of claim 10 utilizing pulses to determine at least one of a rate of movement or a rate change.

13. The method of claim 10, further comprising determining roll, twist and pitch with at least two level sensors.

* * * * *